Patented June 24, 1941

2,246,996

UNITED STATES PATENT OFFICE 2,246,996

CHANGE-SPEED GEARING

Friedrich Kreis, Berlin-Lichterfelde, Germany, assignor to Gesellschaft zur Konstruktion und Verwertung Automatisch-Mechanischer Getriebe m. b. H., Berlin-Oberschoneweide, Germany Application October 24, 1939, Serial No. 301,050 In Germany October 27, 1938

4 Claims. (Cl. 74—336)

The invention relates to change-speed gearing and particularly to such gearing of the automatically shifted type in which the respective gearing stages are connected to the motor by means of centrifugal clutches and in which an overrunning clutch means is provided in each stage below the highest or direct drive stage, said overrunning clutch means acting to permit overdrive of the driven shaft with respect to a lower stage when the drive is shifted to a higher stage.

Change-speed gearings of the type described have the disadvantage that in the stages below the final speed or direct drive stage, the driving connection between motor and driven shaft is a one way connection so that undesirable free running of the vehicle occurs when the fuel supply to the motor is reduced or cut off. Thus the motor cannot be used as a braking force in hilly country and the vehicle can only be held at a standstill on a hill by setting the brakes when the motor is cut off. It is the object of the invention to eliminate these disadvantages in such transmissions by providing clutch means in connection with at least one of the lower gearing stages which will provide for reversal of the power flow when the driven shaft is rotated by the wheels due to motion of the vehicle whereby the engine may be used as a braking force.

Another object of the invention is to provide in a transmission of the type described an additional one way engaging clutch in one or more of the lower speed stages operative upon drive from the wheels to engage the clutch of the associated gearing stage and thereby connect the motor to the wheels to act as a braking force.

Other objects and advantages of the invention will become apparent from the following detailed description with reference to the accompanying drawing.

Figure 1:
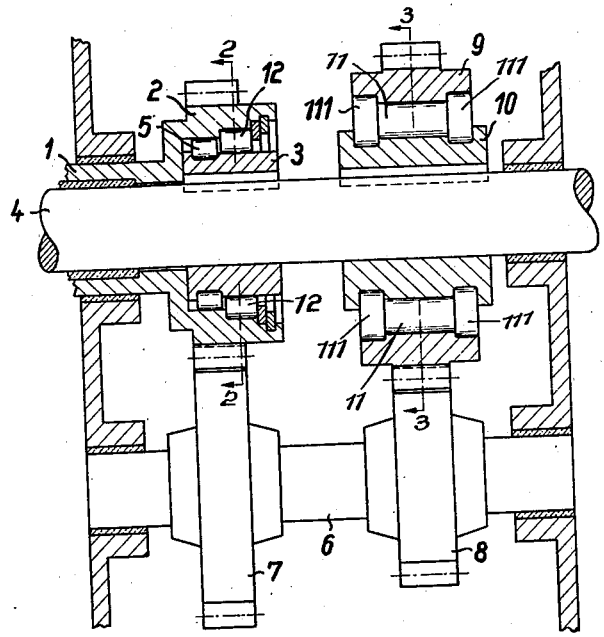
Figure 2:
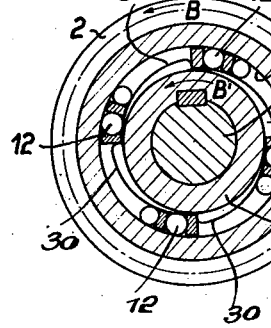
Figure 3:
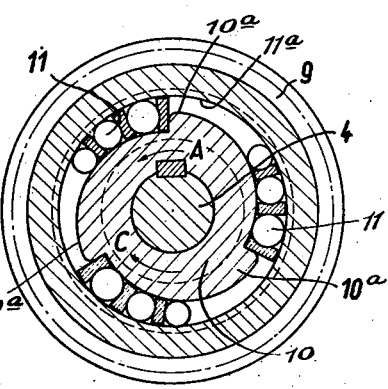

In the drawing, wherein only so much of a transmission of the type described has been shown as is necessary to illustrate the invention applied thereto, Fig. 1 is an axial section through a two-stage change-speed transmission gearing embodying the invention, Fig. 2 is a section on the line 2—2 of Fig. 1, and Fig. 3 is a section on the line 3—3 of Fig. 1.

Referring more particularly to the drawing, 1 indicates a hollow shaft connected through the medium of a centrifugal clutch, not shown, to the engine or other source of power also not shown. The inner end of the shaft 1 has formed or mounted thereon a gear 2 which is journalled by means of rollers 5 on a central core or supporting part 3 keyed on shaft 4. The shaft 4 is the driven shaft and extends through the hollow shaft 1. The races for the roller bearings 5 in the gear 2 and part 3 are concentric and coaxial with the shaft 4.

The gear 2 is in constant mesh with a gear 7 rigidly fixed on the transmission jack shaft 6 and the gear 8, also rigidly fixed on said jack shaft is in contant mesh with a gear 9 which is mounted on the shaft 4 and is provided with a one way driving connection to said shaft. The one way driving connection between the gear 9 and shaft 4 comprises a central core or supporting part 10 keyed on the shaft 4 and provided with cam tracks 10$^a$ which clamp the roller clutching elements 11 against the internal annular track 11$^a$ of the gear 9 when the relative rotation between gear 9 and core 10 is such as to cause the roller clutch elements to ride up on the high parts of the cam tracks 10$^a$. When the shaft 4 overruns the gear 9, the latter runs on roller bearings 111 operating in concentric races provided in the gear 9 and core 10.

In the operation of the gearing thus far described, the drive at low speed is through shaft 1 and gear 2 through gears 7 and 8 to gear 9 and thence through the one way clutch 11 to shaft 4. As the speed increases the shaft 4 is directly connected to the motor shaft by means of a centrifugal clutch, not shown, its speed will exceed that of the gear 9 in the direction of the arrow A in Fig. 3, thus causing the clutching rollers 11 to ride to the low end of cam tracks 10$^a$ and releasing the driving connection between gear 9 and shaft 4.

In order to provide, in the gearing stage described above, a means for effecting a driving connection between the wheels and motor when the shaft 4 is rotated from the wheels at a greater speed than the motor is running, an additional one way engaging or overrunning clutch is provided between gear 2 and shaft 4. As will be seen from Figs. 1 and 2, this clutch includes cam tracks 30 formed with the core member 3 and roller clutching elements 12 disposed between the cam tracks 30 and an internal annular roller track 31 on the gear 2. When the motor is driving the vehicle through the gear 2, this gear rotates in the direction of the arrow B faster than the shaft 4 is driven in the same direction and since the cam tracks 30 ascend in the opposite direction, the clutching rollers 12 are in released position. Also since shaft 4, when directly connected to the engine rotates at the same speed as gear 2, the clutching rollers remain inoperative during direct drive from the motor at high speeds.

When the fuel supply is reduced at high speed or in any case where the shaft 4 and thus the core part 3 is driven by the wheels at a greater speed than the gear 2 is driven by the motor as indicated by arrow B' in Fig. 2, the rollers 12 are caused to ride up on the cam tracks 30 thus locking the core 3 and gear 2 together and establishing a power connection from the wheels to the motor so that the latter may act as a brake.

In case the vehicle is stopped while going up grade so that it tends to roll backwards when the engine is disconnected from the shafts 1 and 4, the wheels will turn the shaft 4 in the direction of the arrow C in Fig. 3 thus causing the clamping rollers to ride up on the cam tracks 10ª and lock the gear 9 to the shaft 4 whereupon the gear 2, through gears 8 and 7 is driven in the direction of the arrow D in Fig. 2 at the gear 2, through gears 8 and 7 is driven in the direction of the arrow D in Fig. 2 at a speed greater than that of the shaft 4. This drive of the gear 2 at a greater speed than that of the shaft 4 causes the rollers 12 to ride up on the cam tracks 30 and lock the gear 2 to the shaft 4 whereupon a blocking or jamming action occurs which locks the transmission gears to prevent further rotation of the shaft 4 by the wheels due to backward movement of the vehicle. Thus the vehicle is automatically prevented from rolling backward down the incline without resort to the brakes.

While the invention has been illustrated and described in connection with a two stage transmission system, it will be understood that the same is applicable to all multi-stage change-speed gearings of the type described. It will be further understood that various changes in the details of construction and operation of the respective parts may be resorted to without departing from the spirit of the invention within the scope of the appended claims.

I claim:

1. In transmission gearing of the character described a driving shaft adapted to be connected to a motor shaft, a driven shaft also adapted to be connected to said motor shaft, a gear rigid with said driving shaft, a second gear journalled on said driven shaft, a one way engaging clutch means between said second gear and said driven shaft operative to permit overrunning of said driven shaft in relation to said gear in the advance direction, reduction gears connecting said first and second gears in driving relation, and a one way engaging clutch means between said first mentioned gear and said driven shaft operative to permit overrunning of said first mentioned gear in relation to said driven shaft in the advance direction, whereby to establish driving connection between said first mentioned gear and said driven shaft when said driven shaft is rotated in such manner as to reverse the direction of power flow through said transmission gearing.

2. In a change-speed transmission gearing of the character described, a hollow driving shaft adapted to be connected in direct driving relation with a motor, a driven shaft coaxial with and extending through said driving shaft, gearing between said driving and driven shafts for driving said driven shaft from said driving shaft at reduced speed comprising a gear rigid with said driving shaft, a second gear journalled on said driven shaft, a one way engaging clutch means between said second gear and said driven shaft, constant mesh reduction gear means connecting said first and second gears in driving relation, and a one way engaging clutch means between said gear on said driving shaft and said driven shaft to establish driving connection between said driven shaft and said gear on said driving shaft when said driven shaft is rotated at a greater speed than said driving shaft or when said gear on said driving shaft is reversely driven through said second gear from said driven shaft.

3. In change-speed transmission gearing of the character described including a reduced speed driving shaft adapted to be connected in direct driving relation with a motor, a driven shaft adapted to be driven at different speeds from said motor, gearing for driving said driven shaft from said driving shaft at reduced speed comprising a gear rigid with said driving shaft, a second gear journalled on said driven shaft, a one way engaging clutch means between said second gear and said driven shaft and reduction gear means connecting said first and second gears in driving relation, a one way engaging clutch means between said driving shaft and said driven shaft to establish driving connection between said driving and driven shafts when the speed of rotation of said driven shaft is greater than the speed of rotation of said driving shaft or when said driven shaft is rotated in a reverse direction to rotate said driving shaft through said reduction gear means in a reverse direction.

4. In an automatic multi-stage change-speed transmission in which the gears of each stage are constantly in mesh and in which centrifugal clutch means is provided between each gearing stage and the engine drive shaft, the combination wherein one gearing stage below the highest stage comprises a drive gear journalled on the driven shaft, a free-wheel clutch between said drive gear and said driven shaft operative to permit overrunning of said gear with relation to said shaft in the advance direction, a driven gear journalled on said driven shaft, a free-wheel clutch between said driven gear and said driven shaft operative to permit overrunning of said driven shaft in relation to said driven gear in the advance direction, a countershaft, and gears on said countershaft one in mesh with said drive gear and one in mesh with said driven gear to establish a reduction drive connection therebetween, whereby when the driven shaft rotates in the advance direction at a greater speed than said drive shaft said first mentioned free wheel clutch will couple said driving gear to said driven shaft and whereby when said driven shaft rotates in the reverse direction both of said free wheeling clutches engage and said gearing becomes locked and arrests reverse rotation of said driven shaft.

FRIEDRICH KREIS.